(12) United States Patent
Milstein

(10) Patent No.: US 12,081,312 B1
(45) Date of Patent: Sep. 3, 2024

(54) APPARATUS AND METHOD FOR NONDESTRUCTIVELY DISABLING A SPACE SATELLITE

(71) Applicant: Seth M. Milstein, West Orange, NJ (US)

(72) Inventor: Seth M. Milstein, West Orange, NJ (US)

( * ) Notice: Subject to any disclaimer, the term of this patent is extended or adjusted under 35 U.S.C. 154(b) by 304 days.

(21) Appl. No.: 17/672,836

(22) Filed: Feb. 16, 2022

Related U.S. Application Data

(60) Provisional application No. 63/151,703, filed on Feb. 20, 2021.

(51) Int. Cl.
*H04B 7/185* (2006.01)

(52) U.S. Cl.
CPC ................ *H04B 7/18515* (2013.01)

(58) Field of Classification Search
CPC ............................ H04B 7/185–195
See application file for complete search history.

(56) References Cited

U.S. PATENT DOCUMENTS

| | | | |
|---|---|---|---|
| 2013/0082879 A1* | 4/2013 | Fuchs | H01Q 5/328 343/700 MS |
| 2015/0136913 A1* | 5/2015 | Dillon | B64G 5/00 244/171.1 |
| 2018/0286052 A1* | 10/2018 | McArdle | G06T 7/20 |

FOREIGN PATENT DOCUMENTS

| | | | | |
|---|---|---|---|---|
| CN | 207011205 U | * | 2/2018 | |
| FR | 3092126 A1 | * | 7/2020 | E04H 15/20 |
| WO | WO-2016185096 A1 | * | 11/2016 | H01L 23/4985 |

* cited by examiner

*Primary Examiner* — Raymond S Dean
(74) *Attorney, Agent, or Firm* — Joseph B. Milstein, PC; Joseph B. Milstein

(57) ABSTRACT

A cloaking apparatus for nondestructively disabling a target space satellite. The cloaking apparatus is lifted into space into an orbit closely approximating that of a target space satellite. The cloaking apparatus has a surface that, when placed in a closed configuration, provides a closed electrically conductive surface. In an alternative, the cloaking apparatus has a surface that is optically opaque, so that when properly positioned, it cuts off optical signals from reaching or leaving the target space satellite. The cloaking apparatus in some embodiments can be controlled by an external controller. The cloaking apparatus, when cloaking the target space satellite, causes the target space satellite to appear to be out of operation, in that the target satellite no longer communicates with an external station, while not actually damaging or destroying the target space satellite.

20 Claims, 10 Drawing Sheets

Kanopus-V
(PRIOR ART)

APPARATUS AND METHOD FOR NONDESTRUCTIVELY DISABLING A SPACE SATELLITE

CROSS-REFERENCE TO RELATED APPLICATIONS

This application claims priority to and the benefit of U.S. provisional patent application Ser. No. 63/151,703, filed Feb. 20, 2021, which application is incorporated herein by reference in its entirety.

STATEMENT REGARDING FEDERALLY FUNDED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

FIELD OF THE INVENTION

The invention relates to space satellites in general and particularly to apparatus and methods suitable to nondestructively disable target space satellites. The terms "target space satellite" and "nondestructively disable" are defined in the section titled DEFINITIONS.

BACKGROUND OF THE INVENTION

Manmade satellites that orbit the planet Earth have been in operation since Russia launch Sputnik 1 on Oct. 4, 1957. Since that time, many thousands of objects have been placed in orbit around the Earth. Each such orbiting object will be referred to as a satellite in this description.

Some of the capabilities that such satellites provide are observations of the planet Earth and its properties (such as weather satellites, mapping satellites and others), providing communications capability (such as satellites that provide telephone, television and internet based communications), providing scientific research capabilities (such as the International Space Station and various telescopes for observing extraterrestrial objects), and providing classified information.

Numerous patents have been issued that cover different aspects of satellite technology. They include patents that describe satellites with imaging systems and their use, patents that describe launching satellites, patents that describe making or fabricating satellites, and patents that describe identifying satellites, among others.

Also known in the prior art is Reid et al., U.S. Pat. No. 10,567,072, issued Feb. 18, 2020, titled "Satellite communications subsystem in-orbit verification system and methodologies," which is said to disclose satellite systems and more particularly, to the provision of novel systems and methods for verifying the in-orbit performance and operation of satellite communications subsystems. In contrast to traditional Payload IOT (in-orbit test), the invention operates without an uplink signal, by generating hardware-specific signatures using isolated, internally generated, thermal noise. It has been found that this noise provides a very stable, repeatable signal for testing. Prior to launch, a repeater command sequence is executed to generate a hardware-specific signature based on the internally-generated noise. The same repealer [sic, repeater] command sequence is then executed in-orbit to determine whether the hardware-specific signature has changed. The two signatures may be recorded and compared using a simple tool such as a spectrum analyzer. The methods also include novel use of the sun as a test signal source to calibrate equipment, to quantify atmospheric effects and to be used as an intermediate reference power level during measurements.

Also known in the prior art is Lumaca et al., U.S. Pat. No. 10,906,671, issued Feb. 2, 2021, titled "Modular architecture optimized for making microsatellites," which is said to disclose a method for making a microsatellite, comprising providing: modules of a first type configured to house electronic boards of a microsatellite; modules of a second type configured to house devices and systems of a microsatellite; and modules of a third type comprising first and second interface means configured to be coupled to a launch vehicle and to external appendages of a microsatellite, respectively; said modules of a third type being designed to cause a body of a microsatellite to have a predefined height; wherein all the modules of the first, second and third types are configured to be stacked regardless of the type. The method further comprises making a body of a microsatellite by stacking modules of different types, wherein the stacked modules include at least one module of the second type and at least one module of the third type.

Also known in the prior art is Marchandise et al., U.S. Pat. No. 11,066,190, issued Jul. 20, 2021, titled "Method for deploying a satellite constellation," which is said to disclose a method of deploying a constellation of satellites includes using a single launch vehicle to deploy a plurality of satellites at an initial altitude on a same initial orbit, controlling said satellites such that an altitude of some of the satellites is modified while their inclination relative to an equatorial plane and a type of trajectory, of the some of the satellites, remains identical so that each satellite reaches a drift altitude selected from a drift set, with orbits of various satellites shifting relative to one another, and controlling the satellites to be moved sequentially in order to reach a same final altitude, said sequential movement being performed in such a manner that the satellites describe final orbits having trajectories with a same angle of inclination relative to the equatorial plane, a same apogee and perigee, and the same final altitude but presenting distinct longitudes for ascending nodes.

Also known in the prior art is Gosian et al., U.S. Pat. No. 11,125,623, issued Sep. 21, 2021, titled "Satellite onboard imaging systems and methods for space applications," which is said to disclose satellite onboard imaging systems having a look-down view and a toroidal view of the Earth. In one embodiment, a satellite onboard imaging systems include an infrared sensing system and a controller. The infrared sensing system includes a first imager configured to have a first field of view that observes a look-down view of the Earth from a satellite and a second imager configured to have a second field of view that observes a toroidal view of the Earth centered at the satellite. The controller is coupled to the first imager and the second imager and operable to process image data from the first imager and the second imager. The controller is further operable to output indications of thermal energy of an identical, or different objects based on the first thermal image signal, the second thermal image signal, or both.

Launch vehicles for putting satellites into orbit around the Earth are well-known in the prior art. Examples include the R-7 rocket used to launch Sputnik 1 (which rocket was known to NATO sources as the T-3 or M-104, and Type A), the Atlas, Redstone, Jupiter and Saturn rockets used by the United States, the Falcon series of rockets used by the commercial firm SpaceX, and numerous other rockets used by over 20 other countries to launch satellites.

Also known in the prior art is Wagner, U.S. Pat. No. 6,182,928, issued Feb. 6, 2001, titled "Method for placing an artificial satellite on a geostationary orbit," which is said to disclose a method for placing an artificial satellite on a geostationary orbit injected on said orbit by a launch vehicle. The method is characterised in that the assembly consisting of the last stage (L) of said launch vehicle and satellite (S) be injected on the geostationary orbit (G) is first directly sent on a circular orbit (C), called extinction orbit, near the geostationary orbit, but sufficiently distant therefrom to avoid possible interferene with space objects already on the geostationary orbit (G), the satellite (S) is separated from said last stage (L), which stays on said extinction orbit (C), and the satellite (S) reaches the geostationary orbit (G) from said extinction orbit (C).

Also known in the prior art is Palmer et al., U.S. Pat. No. 9,617,016, issued Apr. 11, 2017.

Also known in the prior art is Lyons, U.S. Pat. No. 4,231,537, issued Nov. 4, 1980, titled "Satellite-launch vehicle combination and method," which is said to disclose a satellite intended for insertion into a quasi-synchronous earth orbit that is adapted for efficient launch by minimizing the amount of launch vehicle cargo capacity employed. The satellite includes at least one major thrust source, such as an apogee kick motor, defining a major thrust axis for the satellite. A reusable launch vehicle such as the Space Shuttle, includes a cargo bay whose largest dimension is parallel to the launch vehicle thrust axis. Minimizing satellite use of cargo bay capacity is obtained by adapting the satellite to lie within the cargo bay of the launch vehicle with its thrust axis perpendicular to the thrust axis of the launch vehicle. titled "Launch vehicle and system and method for economically efficient launch thereof," which is said to disclose a launch system, a launch vehicle for use with the launch system, and methods of launching a payload utilizing the launch vehicle and/or the launch system. The disclosure can provide for delivery of the payload at a terrestrial location, an Earth orbital location, or an extraorbital location. The launch vehicle can comprise a payload, a propellant tank, an electrical heater wherein propellant, such as a light gas (e.g., hydrogen) is electrically heated to significantly high temperatures, and an exhaust nozzle from which the heated propellant expands to provide an exhaust velocity of, for example, 7-16 km/sec. The launch vehicle can be utilized with the launch system, which can further comprise a launch tube formed of at least one tube, which can be electrically conductive and which can be combined with at least one insulator tube. An electrical energy source, such as a battery bank and associated inductor, can be provided.

The New York Times reported on Nov. 16, 2021, in an article entitled "Russia Acknowledges Antisatellite Missile Test," that "Russia's military acknowledged on Tuesday that it had conducted a test of an antisatellite weapon that obliterated a target in orbit, sending a vast cloud of debris zipping around Earth and forcing astronauts on the International Space Station to seek shelter." The article also reported that "The blast created more than 1,500 pieces of trackable debris and is likely to eventually generate hundreds of thousands of smaller pieces, according to the U.S. State Department, which was sharply critical of the test for posing dangers to satellites and crewed spaceships . . . . The U.S. Space Command said the debris is likely to remain in orbit for years or even decades, adding to a vast array of space junk. A few days before the Russian test, the space station had to dodge debris from a 2007 Chinese weapons test." The numerous pieces of debris caused astronauts on the International Space Station to briefly take shelter in re-entry capsules as a precaution. It is apparent that methods of disabling a satellite that rely on physically destroying the satellite pose significant problems.

There is a need for technology that allows a satellite to be disabled in a nondestructive manner.

SUMMARY OF THE INVENTION

According to one aspect, the invention features a cloaking apparatus for nondestructively disabling a target space satellite, comprising: a structure configured to intercept an electromagnetic signal, the electromagnetic signal having a component in the infrared, visible, ultraviolet or radio segments of the electromagnetic spectrum; the structure having at least one surface that is opaque to the electromagnetic signal having a component in the infrared, visible, ultraviolet or radio segments of the electromagnetic spectrum; the structure configured to nondestructively envelop at least a portion of the target space satellite, thereby rendering the target space satellite incapable of communicating using the electromagnetic signal having a component in the infrared, visible, ultraviolet or radio segments of the electromagnetic spectrum with a station external to the target space satellite so as to make the target space satellite appear to be inoperative.

In one embodiment, the at least one surface of the structure is electrically conductive so as to prevent radio waves from passing through the structure when the at least one surface is configured to be a closed surface.

In another embodiment, the at least one surface of the structure is optically opaque so as to prevent infrared, visible, or ultraviolet waves from passing through the structure when the structure has the at least one surface configured to be a closed surface.

In yet another embodiment, the apparatus has an aperture large enough to accommodate the target space satellite, the aperture configured to be closed by an actuator upon entry of the target space satellite therethrough.

In still another embodiment, the structure having at least one surface that is opaque to the electromagnetic signal having a component in the infrared, visible, ultraviolet or radio segments of the electromagnetic spectrum comprises an electrically conductive surface.

In a further embodiment, the structure having at least one surface that is opaque to the electromagnetic signal having a component in the infrared, visible, ultraviolet or radio segments of the electromagnetic spectrum comprises an optically opaque surface.

According to another aspect, the invention relates to a method of nondestructively disabling a target space satellite, comprising the steps of: identifying a target space satellite to be nondestructively disabled, including determining its orbital characteristics; providing a cloaking apparatus for nondestructively disabling a target space satellite, the cloaking apparatus comprising: a structure configured to intercept an electromagnetic signal, the electromagnetic signal having a component in the infrared, visible, ultraviolet or radio segments of the electromagnetic spectrum; the structure having at least one surface that is opaque to the electromagnetic signal having a component in the infrared, visible, ultraviolet or radio segments of the electromagnetic spectrum; the structure configured to nondestructively envelop at least a portion of the target space satellite, thereby rendering the target space satellite incapable of communicating using the electromagnetic signal having a component in the infrared, visible, ultraviolet or radio segments of the electromagnetic spectrum with a station external to the target space satellite so as to make the target space satellite appear to be inoperative; lifting the cloaking apparatus for nondestructively disabling the target space satellite into an orbit that closely approximates the orbital characteristics of the target space satellite; and moving the cloaking apparatus for nondestructively disabling the target space satellite so as to envelop at least a portion of the target space satellite, whereby the target space satellite loses communication with a station external to the target space satellite so as to make the target space satellite appear to be inoperative.

In one embodiment, the cloaking apparatus is moved in orbit by an engine or thruster, which engine or thruster may be provided as a component separate from the cloaking apparatus.

In another embodiment, the cloaking apparatus is monitored by an external station, the external station capable of providing a signal that indicates that the target space satellite has been enveloped.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Figure 1:
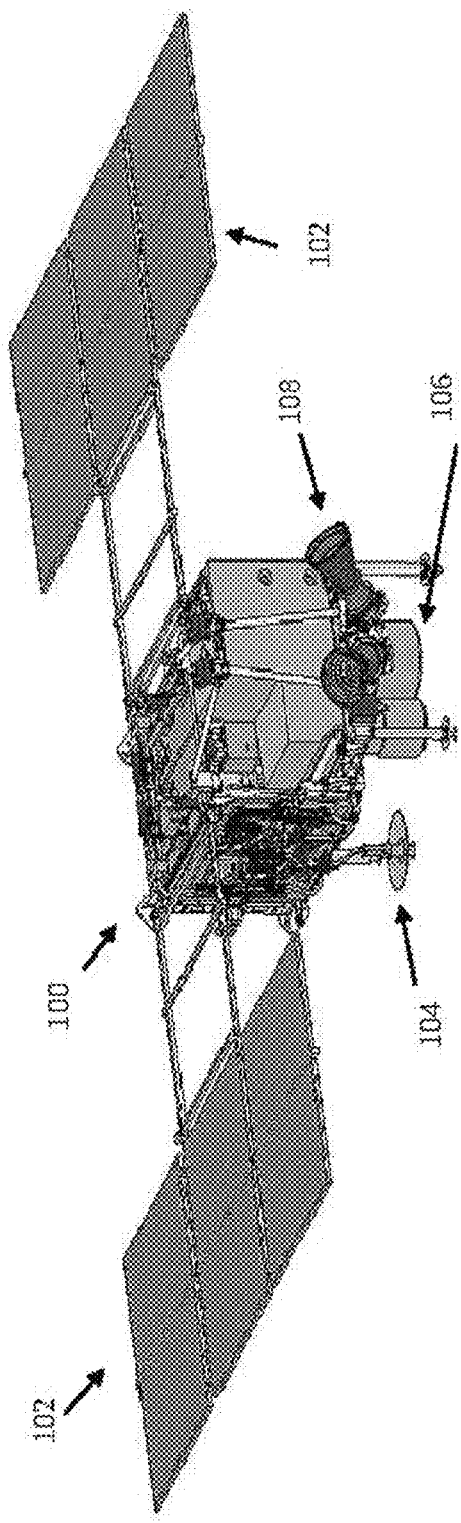
FIG. 1 illustrates a prior art Russian satellite named Kanopus-V.

This application relates to methods and apparatus for nondestructively disabling a space satellite, which will be referred to as the "target space satellite." In using the systems and methods of the invention, it is possible that incidental physical damage may result to a target space satellite, for example due to impact of the apparatus with the target space satellite or other circumstances, but is not the explicit purpose of the apparatus and methods to cause damage to a target space satellite. In particular, it is an advantage of the systems and methods of present invention that to the extent possible, little or no physical damage is caused to the target space satellite. In particular the present invention explicitly contemplates that the target space satellite is not broken into multiple pieces, so as to avoid littering the near Earth space environment with debris which can cause damage to otherwise functional satellites and which can endanger space conveyances and their occupants, such as the International Space Station, space shuttles and the like. The duration of the nondistructive disablement that is contemplated can be indefinite: it may be for a limited period of time or for the remaining useable lifetime of a target space satellite.

The apparatus used to nondestructively disable the target space satellite will be placed in orbit using a launch system and a payload, which payload will be referred to as a "deployment structure" (that is, the structure that deploys the disabling apparatus or cloaking apparatus). It provides the ability to disable the target space satellite in a nondestructive manner, without creating any debris. In general, the method of operation involves causing a target space satellite to lose communication with a station external to said target space satellite. The station external to the target space satellite can be a station on the surface of the Earth (cither on land or at sea), or it can be a station that is in motion, such as another satellite in Earth orbit or an aircraft. This can be accomplished by intercepting the communication signal in either or both directions (e.g., to or from the satellite), or by preventing a power source, such as a solar cell array, from receiving optical energy, which will cause the target space satellite to run out of power, which will shut down its communication equipment. The target space satellite will then appear to be in its expected orbit, but to have failed, in that it no longer responds to commands, no longer provides information and no longer appears to be operating according to a predetermined schedule.

Among the advantages of the present invention are the following features. The apparatus and method are precise in that only a specific satellite is targeted. The apparatus and method are non-polluting of the space environment because the apparatus and method creates no space debris (no debris in the orbit of the satellite being nondestructively disabled). The apparatus and method are agnostic in that any satellite may be nondestructively disabled, and the orbit is irrelevant; all radio frequency signals are blocked; all electro-optic (EO) and infra-red (IR) sensors are obscured, so the target space satellite ceases to collect data. In addition, in some embodiments, optical communication can be blocked. The apparatus and method are passive and persistent, and do not require continued expenditure of energy to remain effective.

The apparatus and method do not permanently damage the target space satellite. As regards the owner of the target space satellite, the target space satellite remains in its expected orbit, but fails to respond to instructions and/or to transmit on an expected schedule, so the owner of the target space satellite is made to believe that the target space satellite has simply failed.

Among the requirements of the apparatus and method are the following. The apparatus requires one cloaking device per satellite. The apparatus and method requires a launch vehicle or a satellite with maneuver capability to gain proximity to the target space satellite.

Additional features of the apparatus and method are that the operation is reversible, in that it does not destroy or damage the target space satellite, but rather renders it inoperative for some time period. In some embodiments, the apparatus may be designed with a releasing mechanism. The apparatus in various embodiments may include on board guidance features or may be aimed by a launcher or other parts of a payload. The apparatus is inert as regards explosives, because the payload does not use an explosive warhead.

The principle of operation of the apparatus is the provision of a Faraday cage, which is an electrically conductive enclosure that prevents electromagnetic signals from passing through it in either direction. If the Faraday cage is also optically opaque, electromagnetic signals in the optical frequency range will be prevented from passing through it in either direction. A properly designed Faraday cage will render the target space satellite effectively "incommunicado" for the time that the Faraday cage is present. As used herein, the word "opaque" if not otherwise modified should be understood to denote a material that is either optically opaque (e.g., opaque to signals in the UV, visible or IR regions of the electromagnetic spectrum) or electromagnetically opaque (e.g., opaque to electromagnetic signals), or both.

Examples of suitable Faraday cages include many different embodiments, such as a conductive (for example, metallically coated) flexible sheet (for example, aluminized Mylar) that can be wrapped around the target space satellite and sealed to form an conductive envelope, or a rigid conductive container (for example, a box or a sphere) having a door that closes an aperture in the container, the aperture being sufficiently large to allow the container to envelope the target space satellite (or alternatively, for the target space satellite to pass through the aperture before the door is closed). In some embodiments, the door of the rigid conductive container can be a sheet of conductively coated flexible material that can be in electrical communication with the conductive container. In other embodiments, the Faraday cage can be a rigid frame, possibly constructed from light weight non-conductive material such as rod or tube, over which a flexible conductive sheet can be placed. In yet another embodiment, the Faraday cage can be an electrically conductive bag having a draw string closure. In any of the embodiments, the Faraday cage can be optically opaque, for example constructed of opaque plastic, opaque metal coating, and/or opaque metal.

As an example of a possible "target space satellite," FIG. 1 illustrates a prior art Russian satellite named Kanopus-V 100.

Kanopus-V is an Earth observation minisatellite mission of the Russian Space Agency, Roskosmos and ROSHYDROMET/Planeta. It was launched on Jul. 22, 2012 and remained in service until at least 2017. It was placed in a polar orbit having the following attributes: Sun-synchronous near-circular orbit on ascending node, altitude=510 km, inclination=97.8°, period=98 minutes, repeat cycle=17 days. This means that over a 17 day period, the Kanopus-V satellite would have a view of the entirety of the Earth's surface numerous times.

As illustrated in FIG. 1, the Kanopus-V satellite 100 has its solar cell panels 102 deployed. The solar cell panels provide electrical power to operate the Kanopus-V satellite. The Kanopus-V satellite has a mass of approximately 450 kilograms, and dimensions measured in units of meters (e.g., less than 10 meters in any dimension). The satellite includes at least one antenna 104 for communication with a base station on Earth, cameras 106 for observing the surface of the Earth and engines (or thrusters) 108 to allow the satellite to control its orbital path and its orientation relative to the Earth.

The overall objective of the Kanopus-V satellite 100 is to monitor Earth's surface, the atmosphere, ionosphere, and magnetosphere to detect and study the probability of strong earthquake occurrence. The requirements call for monitoring of man-made and natural emergencies including natural disasters and hydrometeorological phenomena, mapping, detection of forest fire seats and large environmental pollutant emissions, recording of abnormal phenomena to study the possibility of earthquake prediction, monitoring of agriculture, water and coastal resources, land use and other operational observations of specified regions of the Earth's surface.

The Kanopus-V satellite 100 includes a Panchromatic Imaging System (PSS) and a Multispectral Imaging System (MSS). The PSS is a prototype instrument with the objective to provide panchromatic imagery for environmental monitoring, agriculture and forestry. The PSS imager provides high resolution imagery of 2.5 m on a swath of 20 km. The spectral range is 0.5-0.8 µm. The MSS is a prototype instrument with the objective is to provide multispectral imagery of land and coastal surfaces and ice cover. The MSS instrument provides a spatial resolution of 12 m on a swath of 20 km. Four spectral bands are provided: 0.5-0.6 µm; 0.6-0.7 µm; 0.7-0.8 µm; 0.8-0.9 µm.

The Kanopus-V satellite 100 includes memory to record image data for later transmission to a receiver. The Kanopus-V satellite 100 has onboard data storage of 24 GB. The Kanopus-V satellite 100 includes RF communications using an X-band (8.2 GHZ) downlink of payload data, at a data rate of 300 Mbit/s.

Figure 2:
FIG. 2 is a PSS pansharpened image 200 of Moscow, Russia, acquired on May 6, 2015 by the Kanopus-V satellite.

FIG. 2 is a PSS pansharpened image 200 of Moscow, Russia, acquired on May 6, 2015 by the Kanopus-V satellite. It is an example of the kind of information about what is situated in a region of interest that can be seen by a satellite such as Kanopus-V 100 and that can then be transmitted to a receiver on the ground.

As will be described in greater detail hereafter, one can understand that if the Kanopus-V target space satellite were to be enclosed in a structure that prevents either of electromagnetic radiation in the radio frequency range or electromagnetic radiation in the infrared (IR)/visible/ultraviolet (UV) optical range from reaching or leaving the target space satellite, the target space satellite would appear to be inoperative. The elimination of radio frequency communication (e.g., elimination in the radio, radar, microwave frequency ranges) would prevent any command signals from reaching the satellite and would prevent the satellite from transmitting any data to a receiver on the ground. The elimination of communication using electromagnetic radiation in the optical range would eliminate the possibility of collecting optical data by the satellite, would eliminate the generation of power by the solar cell arrays on the satellite, and would eliminate the possibility of the transmission of data or control signals in the optical frequency range to or from the satellite. For the purposes of the following discussing, the term "transmission of electromagnetic signals" will be used as a general term that is intended to cover both the communication of electromagnetic radiation in the radio frequency range or communication of electromagnetic radiation in the infrared (IR)/visible /ultraviolet (UV) optical range in either direction (input or output) relative to the target space satellite. It is expected that the elimination of the transmission electromagnetic signals will cause the target space satellite to appear to be "inoperative" when in fact it has only been nondestructively disabled, given that the apparatus used to eliminate the transmission of electromagnetic signals can be removed at a later time.

By way of example, the elimination of the transmission of electromagnetic signals may be of consequence when a satellite like Kanopus-V is expected to observe, record and report data about a specific region on the surface of the Earth, whether on land or at sea. For example, it may be important to prevent a second entity (e.g., another nation, or in business, a commercial competitor) to observe activities being conducted by, or assets owned by, a first entity (e.g., a first nation, or a business entity) so as not to allow those observing by way of the target space satellite to gain information that one wishes to keep hidden (or "under wraps").

Figure 3:
FIG. 3 is an image of a prior art Jupiter-C rocket on the launch pad at Cape Canaveral, Florida.

FIG. 3 is an image of a prior art Jupiter-C rocket 300 on the launch pad at Cape Canaveral, Florida. The Jupiter-C was the launch vehicle used for the launch of the first American satellite, Explorer-1, on Jan. 31, 1958.

Figure 4:
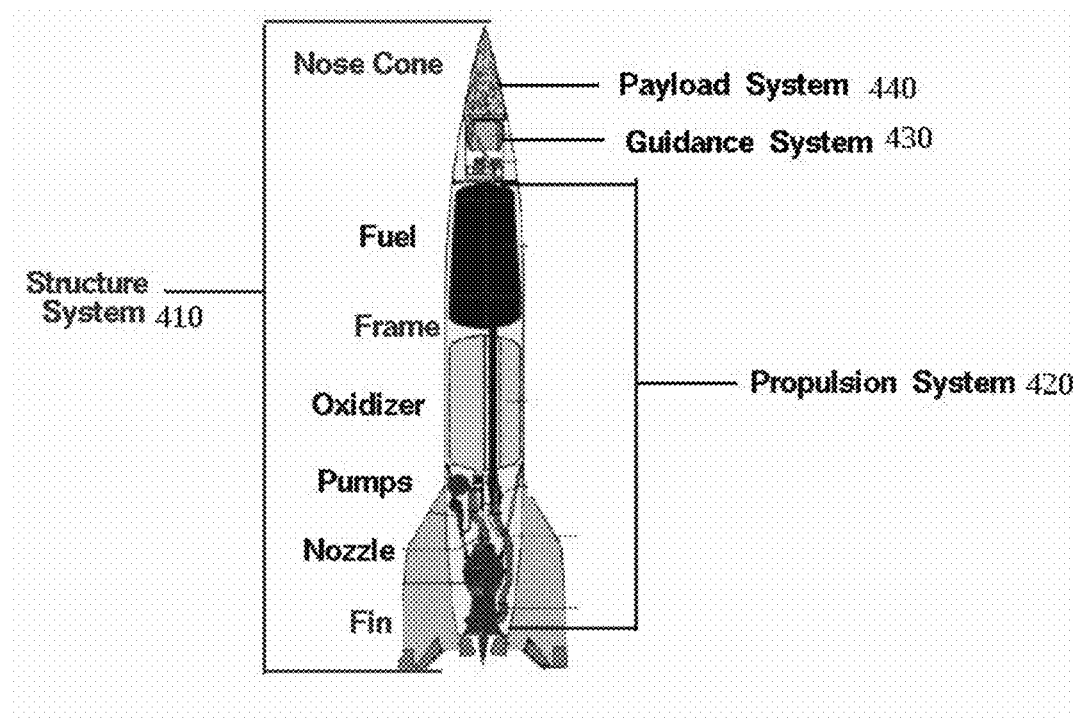
FIG. 4 is a schematic illustration of a launch vehicle containing a deployment structure.

FIG. 4 is a schematic illustration of a prior art launch vehicle containing a system structure 410, a propulsion system 420, a guidance system 430, and a payload system 440 or deployment structure. The deployment structure can be, in various embodiments, a special rocket payload, or a satellite that remains in orbit. The deployment structure includes the apparatus that renders the target space satellite "incommunicado." In the following, for ease of description, the apparatus that renders the target space satellite "incommunicado" will be referred to as the "cloaking apparatus." In each of the following embodiments, the cloaking apparatus comprises a structure that can prevent the target space satellite from receiving or transmitting electromagnetic radiation in the radio frequency range, or a structure that can prevent the target space satellite from receiving or transmitting communication of electromagnetic radiation in the infrared (IR)/visible/ultraviolet (UV) optical range, or a structure that can prevent the target space satellite from receiving or transmitting communication of both kinds of electromagnetic radiation.

Examples of Cloaking Apparatus

Each of the following embodiments of a cloaking apparatus can be fabricated from material which is either or both of optically opaque (for example opaque plastic, metallized plastic or Mylar, metal sheet or foil) and opaque to radio frequencies (for example metallized plastic or Mylar, metal sheet or foil), or both (for example electrically conductive opaque plastic, or metal sheet or foil).

Figure 5:
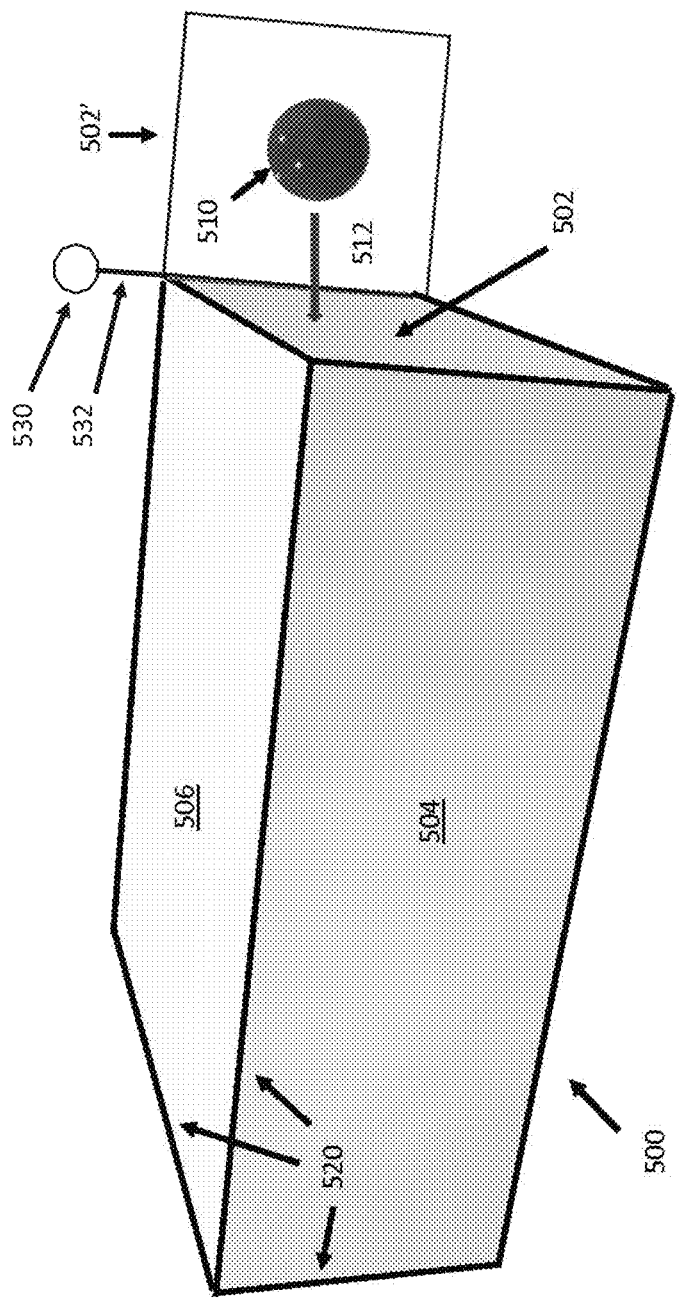
FIG. 5 is a diagram illustrating a first embodiment of a cloaking apparatus having a box-like structure and an aperture that can be closed with a door-like closure.

In a first embodiment, illustrated in FIG. 5, the cloaking apparatus is a box-like structure 500 having an aperture 502 that can be closed with a door-like closure 502', shown in the open position. The door-like structure 502' is attached to the box-like structure by a rotatable structure 532 (such as a rotatable shaft or a hinge) which can be driven by an actuating mechanism such as a motor 530 so that the door-like structure 502' can be moved between an open position and a closed position. In another embodiment, a spring mechanism that can toggle between an open position (e.g., door-like structure 502' is held open) and a closed position (e.g., door-like structure 502' is held closed) may be substituted for the motor 530. In general, there can also be substituted some other actuating mechanism in place of a motor or a spring having two bistable positions that can be toggled. The cloaking structure 500 is illustrated as a rectangular object having a length, a width and a height determined by three mutually perpendicular dimensions illustrated by edges 520.

In another embodiment, the three edges 520 represent a rigid frame structure, and the surfaces 502' 504, 506 (and the other sides not shown) are constructed from opaque flexible material such as metalized Mylar.

The cloaking structure 500 can be sized so as to totally enclose or envelop a target space satellite 510. The cloaking structure 500 can by way of example comprise a box-like frame to define the size and shape made of light structural members, such as plastic tubes or rods, covered with light weight aluminized mylar. The door-like portion 502' of the apparatus can comprise a frame defining the size and shape of the door-like structure covered with light weight aluminized Mylar, and configured to cover the aperture of the box-like portion. The box-like portion and the door-like portions can be connected electrically with a hinge comprising aluminized Mylar that provides electrical conductivity between the two portions. An actuating mechanism such as a motor 530 can be used to close the door-like portion 502' once the target space satellite 510 has been enveloped, or once the motor receives such a signal from an external source, such as a ground-based operator. Arrow 512 is intended to convey that target space satellite 510 and structure 500 are initially separated, and that the relative motion of structure 500 and target space satellite 510 is such that the structure 500 ends up enveloping the target space satellite. In other instances, different materials of construction, as enumerated above, may be used in place of the aluminized Mylar.

Figure 6:
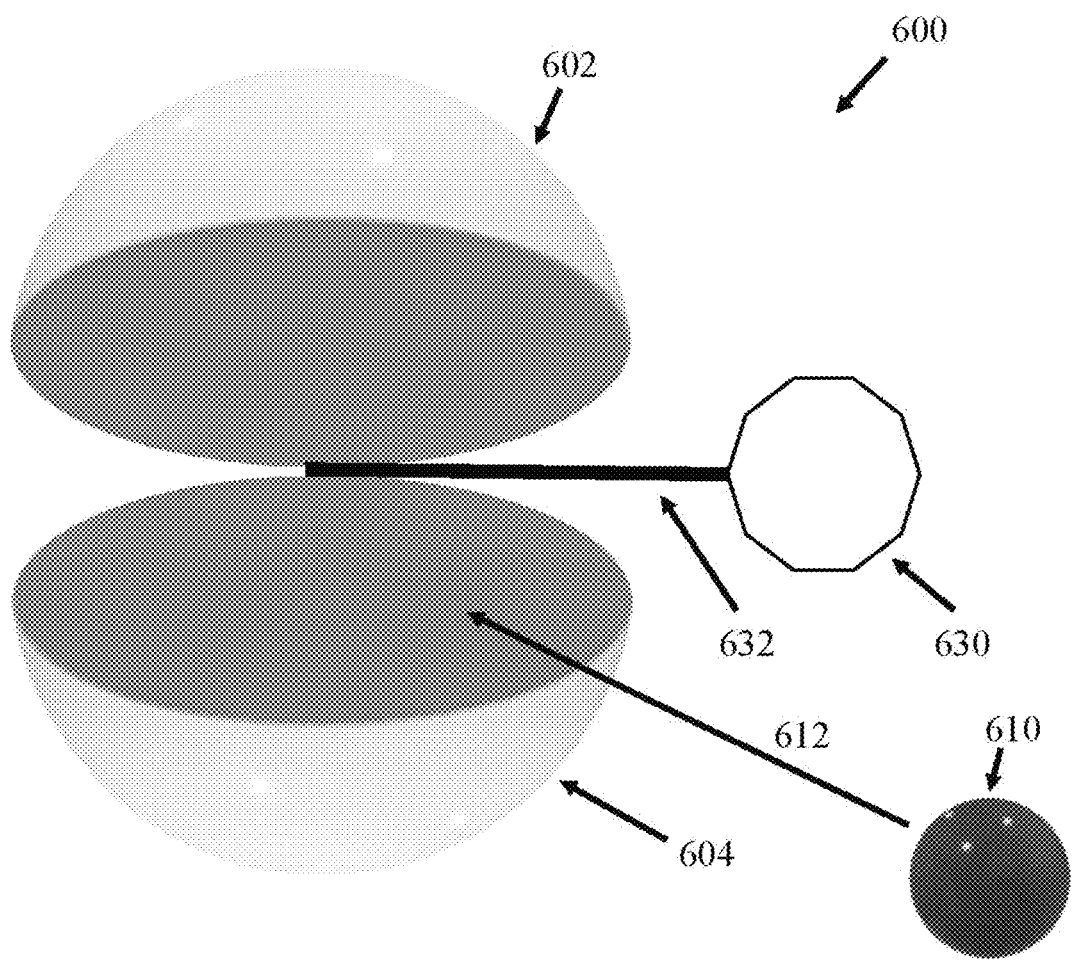
FIG. 6 is a diagram illustrating a second embodiment of a cloaking apparatus having a clam-shell-like structure having an aperture that can be opened and closed by rotation of one half of the clam-shell relative to the other half.

In a second embodiment, illustrated in FIG. 6, the cloaking apparatus is a clam-shell-like structure 600 comprising a plurality of mechanical elements 602, 604, and having an aperture that can be opened and closed by rotation of one element 602 of the clam-shell relative to another element 604 about a rotational structure 632, such as a hinge or a rotation axis, and driven by an actuating mechanism such as a motor 630. The cloaking structure 600 can be sized so as to totally enclose or envelop a target space satellite 610. The cloaking structure 600 can by way of example comprise a clam-shell-like frame to define the size and shape made of light structural members, such as plastic tubes or rods in the form of a geodesic dome, covered with light weight aluminized mylar. The two portions can be connected electrically with a hinge comprising aluminized Mylar that provides electrical conductivity between the two portions. A motor 630 can be used to close the elements 602, 604 once the target space satellite 602 has been enveloped, or once the motor receives such a signal from an external source, such as a ground-based operator. In another embodiment, a spring mechanism that can toggle between an open position (e.g., elements 602, 604 are held open) and a closed position (e.g., elements 602, 604 are held closed) may be substituted for the motor 630. In other embodiments, the structure may comprise more than two segments or elements, which can be assembled into a structure similar to a clam-shell, such as a cylindrical structure. Arrow 612 is intended to convey that target space satellite 610 and structure 600 are initially separated, and that the relative motion of structure 600 and target space satellite 610 is such that the structure 600 ends up enveloping the target space satellite. In other instances, different materials of construction, as enumerated above, may be used in place of the aluminized Mylar.

Figure 7:
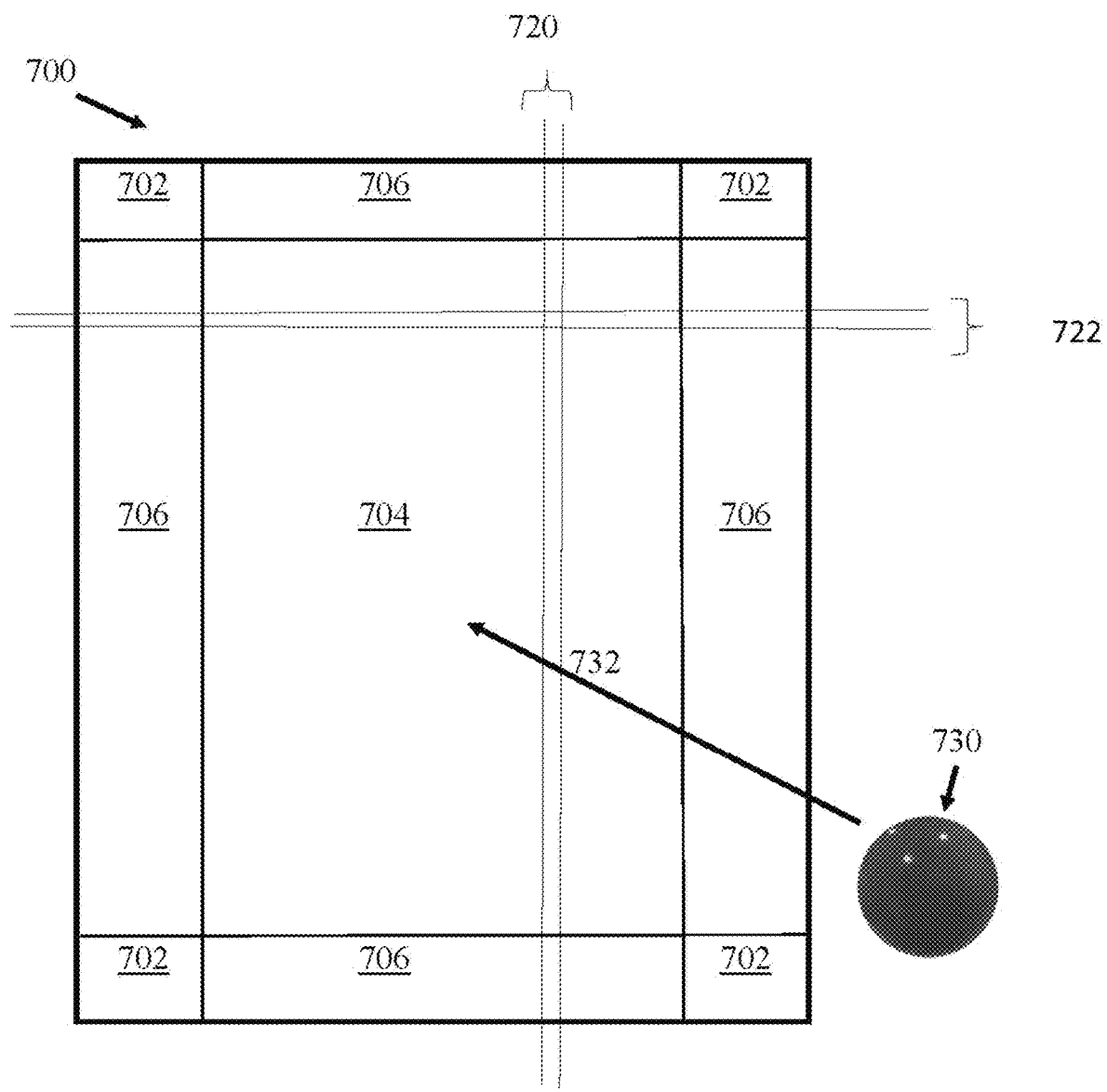
FIG. 7 is a diagram illustrating a third embodiment of a cloaking apparatus having a sheet-like structure having weighted extremities that can be wrapped around a target space satellite.

In a third embodiment, illustrated in FIG. 7, the cloaking apparatus is a sheet-like structure 700 having weighted extremities 702. The sheet-like structure 700 can be wrapped around a target space satellite 730 by having the target space satellite impinge on the center 704 of the sheet-like portion so that the weighted extremities 702 envelop the target space satellite by the inertial response of the weights relative to the target space satellite impinging on the center 704 of the sheet-like apparatus. The cloaking structure 700 can further comprise fibers 720,722 (for example metal wires or carbon fibers) arranged in the two surface dimensions to strengthen the cloaking structure 700 so that it is not ruptured by the target space satellite 730. The cloaking structure can also comprise closing elements (such as magnets or conductive adhesive) situated on one or both sides of regions 702, 706 so that the cloaking structure 700 remains closed once the target space satellite 730 has been enveloped. The cloaking structure 700 can be sized so as to totally enclose or envelop a target space satellite 730. The cloaking structure 700 can by way of example comprise light weight aluminized Mylar. Arrow 732 is intended to convey that target space satellite 730 and structure 700 are initially separated, and that the relative motion of structure 700 and target space satellite 730 is such that the structure 700 ends up enveloping the target space satellite. In other instances, different materials of construction, such as metallic foil, may be used in place of the aluminized Mylar.

Figure 8:
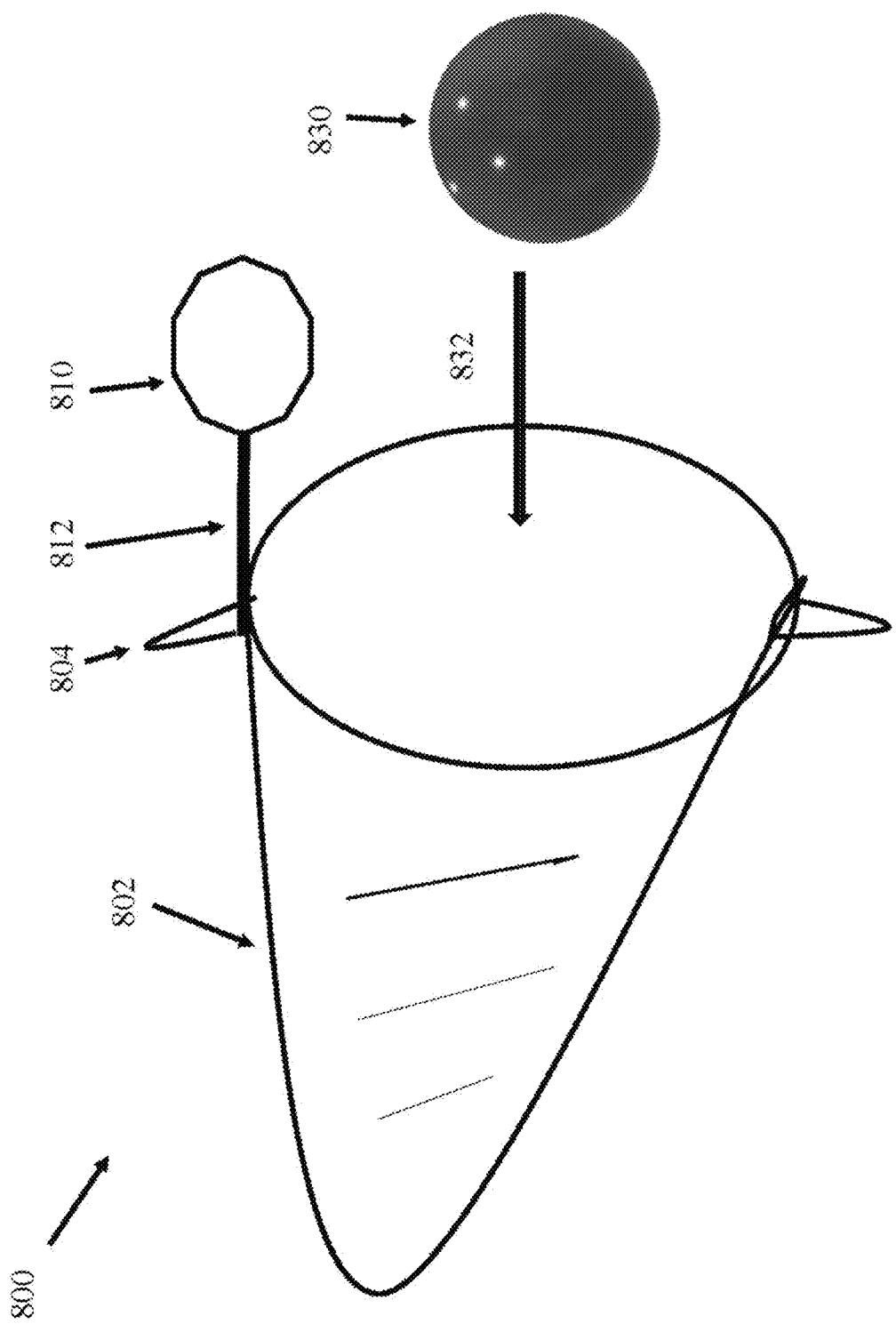
FIG. 8 is a diagram illustrating a fourth embodiment of a cloaking apparatus having a bag-like structure with a drawstring-like closure that can be tightened after the cloaking apparatus envelops a target space satellite.

In a fourth embodiment, illustrated in FIG. 8, the cloaking apparatus is a bag-like structure 800 having a drawstring-like closure 804 that can be tightened after the cloaking apparatus envelops a target space satellite 830. The bag-like structure 800 can be fabricated from metallized Mylar or plastic. An actuating mechanism such as a motor 810 that drives a rotational structure 812 can be used to draw the drawstring once the target space satellite 830 has been enveloped, or once the motor receives such a signal from an external source, such as a ground-based operator. Arrow 832 is intended to convey that target space satellite 830 and structure 800 are initially separated, and that the relative motion of structure 800 and target space satellite 830 is such that the structure 800 ends up enveloping the target space satellite. In another embodiment, a spring mechanism that can toggle between an open position (e.g., drawstring-like closure 804 is held open) and a closed position (e.g., drawstring-like closure 804 is held closed) may be substituted for the motor 810.

Figure 9:
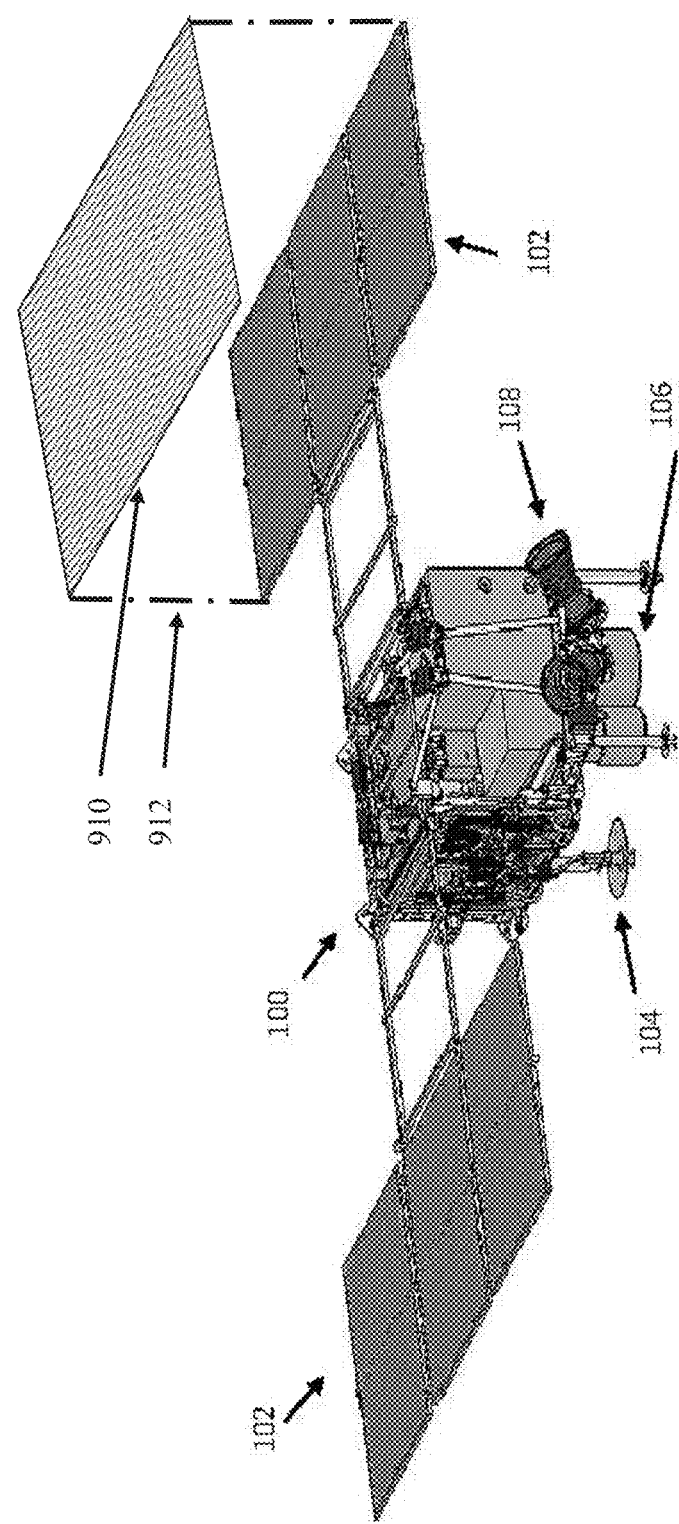
FIG. 9 is an exploded diagram that illustrates a fifth embodiment, in which opaque material is used to cover a solar cell array of a target space satellite.

FIG. 9 illustrates, in exploded form, a fifth embodiment, in which a sheet of opaque material 910 is used to cover a solar cell array 102 of a target space satellite 100 (the same satellite illustrated in FIG. 1) so as to prevent the solar cell array 102 from receiving illumination and prevent the solar panel from generating electrical power, thereby causing the target space satellite 100 to cease operation after some delay for lack of power. In FIG. 9. only one of the two solar cell panels 102 of target space satellite 100 is illustrated as being covered. Broken lines 912 are intended to illustrate the correspondence of the size and orientation of sheet 910 with the solar cell array 102 that it is intended to obscure. In some embodiments, the sheet of opaque material 910 can be fastened onto the solar panels with an adhesive that allows removal, similar to sticky notes that can be applied to sheets of paper. For convenience of exposition, and by way of example only, the target space satellite 100 shown in FIG. 9 was chosen to be the prior art Kanopus-V satellite.

Method of Operation

In general, the method of nondestructively disabling a target space satellite comprises the following steps: identifying a target space satellite to be nondestructively disabled, including determining its orbital characteristics; providing a cloaking apparatus for nondestructively disabling a target space satellite, the cloaking apparatus comprising: a structure configured to intercept an electromagnetic signal, the electromagnetic signal having a component in the infrared, visible, ultraviolet or radio segments of the electromagnetic spectrum; the structure having at least one surface that is opaque to the electromagnetic signal having a component in the infrared, visible, ultraviolet or radio segments of the electromagnetic spectrum; the structure configured to nondestructively envelop at least a portion of the target space satellite, thereby rendering the target space satellite incapable of communicating using the electromagnetic signal having a component in the infrared, visible, ultraviolet or radio segments of the electromagnetic spectrum with a station external to the target space satellite so as to make the target space satellite appear to be inoperative; lifting the cloaking apparatus for nondestructively disabling the target space satellite into an orbit that closely approximates the orbital characteristics of the target space satellite; and moving the cloaking apparatus for nondestructively disabling the target space satellite so as to envelop at least a portion of the target space satellite, whereby the target space satellite loses communication with a station external to the target space satellite so as to make the target space satellite appear to be inoperative.

In some embodiments, the cloaking apparatus is monitored by an external station, such as a station operated by human operators who are situated remotely from the target space satellite. The external station is capable of providing a signal that indicates that said target space satellite has been enveloped.

Figure 10:
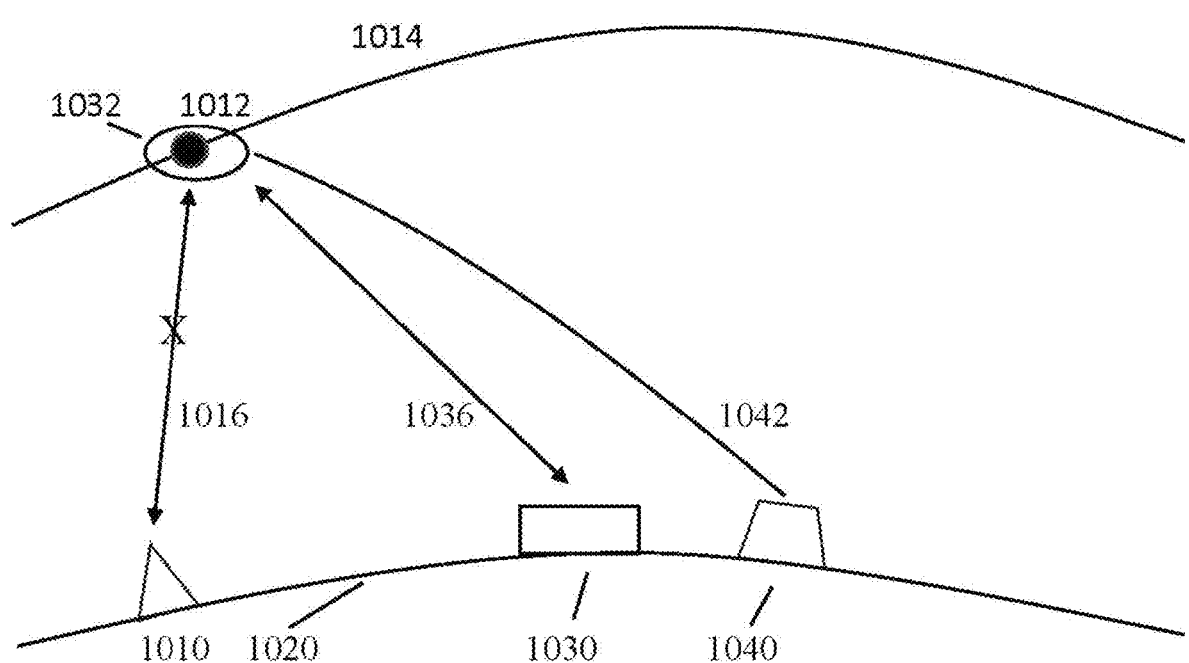
FIG. 10 schematically illustrates a method of operation of the invention according to principles of the invention.

FIG. 10 schematically illustrates a method of operation of the invention that according to principles of the invention.

In FIG. 10, the surface of the Earth 1020 supports a station 1010 external to the target space satellite 1012, which is in orbit 1014. Normally the station 1010 and the target space satellite 1012 are in communication, for example as described hereinbefore with regard to the Kanopus-V satellite. In order to nondestructively disable target space satellite 1012, a rocket is fired from launch pad 1040, lifts the cloaking apparatus along a launch path 1042, and places the cloaking apparatus 1032 in orbit in close proximity to target space satellite 1012. Communication, illustrated by bi-directional arrow 1036, from a control station 1030 that can communicate with the payload carrying cloaking apparatus 1032 allows a controller (human or electronic) to determine when the cloaking apparatus 1032 has enveloped the target space satellite 1012. When the cloaking apparatus is configured to have a complete opaque surface that encloses or envelops (or covers at least a portion, such as solar cell array) of the target space satellite, the communication between the target space satellite 1012 and its external station 1010 is cut off, indicated by bidirectional arrow 1016 having an "X" drawn across it. The target space satellite 1012 then appears to the station 1010 to be inoperative.

Definitions

As used herein, the term "target space satellite" refers to a space satellite that is intended to be nondestructively disabled.

As used herein, the term "nondestructively disable" means to disable without causing deliberate physical damage, but simply causing the target space satellite so nondestructively disabled to be effectively inoperative, which may include being actually inoperative. In colloquial terms, the term "nondestructively disable" can be thought of as causing the target space satellite to go "off line" without causing deliberate physical damage.

Any reference in the claims to an electronic signal or an electromagnetic signal (or their equivalents) is to be understood that in a preferred embodiment the signal is a non-transitory electronic signal or a non-transitory electromagnetic signal. If the signal per se is not claimed, the reference may in some instances be to a description of a propagating or transitory electronic signal or electromagnetic signal.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

INCORPORATION BY REFERENCE

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A cloaking apparatus for nondestructively disabling a target space satellite, comprising:
    a structure having an open configuration and a closed configuration, said structure configured to allow entry of a target space satellite into said structure when in said open configuration, and to envelop at least a portion of said target space satellite when in said closed configuration; and
    an actuator configured to move said structure between said open configuration and said closed configuration;
    said structure when in said closed configuration having at least one surface configured to intercept an electromagnetic signal, said at least one surface configured to be opaque to said electromagnetic signal, said electromagnetic signal having a component in the infrared, visible, ultraviolet or radio segments of the electromagnetic spectrum;
    said structure when in said closed configuration configured to render said target space satellite incapable of communicating with a station external to said target space satellite.

2. The cloaking apparatus for nondestructively disabling a target space satellite of claim 1, wherein said at least one surface of said structure is electrically conductive so as to prevent radio waves from passing through said structure when said at least one surface is configured to be a closed surface.

3. The cloaking apparatus for nondestructively disabling a target space satellite of claim 1, wherein said at least one surface of said structure is optically opaque so as to prevent infrared, visible, or ultraviolet waves from passing through said structure when said structure has said at least one surface configured to be a closed surface.

4. The cloaking apparatus for nondestructively disabling a target space satellite of claim 1, wherein said apparatus has an aperture large enough to accommodate said target space satellite, said aperture configured to be closed by said actuator upon entry of said target space satellite therethrough.

5. The cloaking apparatus for nondestructively disabling a target space satellite of claim 1, wherein said structure having at least one surface that is opaque to said electromagnetic signal having a component in the infrared, visible, ultraviolet or radio segments of the electromagnetic spectrum comprises an electrically conductive surface.

6. The cloaking apparatus for nondestructively disabling a target space satellite of claim 1, wherein said structure having at least one surface that is opaque to said electromagnetic signal having a component in the infrared, visible, ultraviolet or radio segments of the electromagnetic spectrum comprises an optically opaque surface.

7. A method of nondestructively disabling a target space satellite, comprising the steps of:
    identifying a target space satellite to be nondestructively disabled, including determining its orbital characteristics;
    providing a cloaking apparatus for nondestructively disabling a target space satellite, said cloaking apparatus comprising:
        a structure having an open configuration and a closed configuration, said structure configured to allow entry of a target space satellite into said structure when in said open configuration, and to envelop at least a portion of said target space satellite when in said closed configuration; and
        an actuator configured to move said structure between said open configuration and said closed configuration;
        said structure when in said closed configuration having at least one surface configured to intercept an electromagnetic signal, said at least one surface configured to be opaque to said electromagnetic signal, said electromagnetic signal having a component in the infrared, visible, ultraviolet or radio segments of the electromagnetic spectrum;
        said structure when in said closed configuration configured to render said target space satellite incapable of communicating with a station external to said target space satellite;
    lifting said cloaking apparatus for nondestructively disabling said target space satellite into an orbit that closely approximates said orbital characteristics of said target space satellite; and
    moving said cloaking apparatus for nondestructively disabling said target space satellite so as to envelop at least a portion of said target space satellite, whereby said target space satellite is rendered incapable of communication with a station external to said target space satellite.

8. The method of nondestructively disabling a target space satellite of claim 7, wherein said cloaking apparatus is moved in orbit by an engine or thruster, which engine or thruster may be provided as a component separate from said cloaking apparatus.

9. The method of nondestructively disabling a target space satellite of claim 7, wherein said cloaking apparatus is monitored by an external station, said external station capable of providing a signal that indicates that said target space satellite has been enveloped.

10. The method of nondestructively disabling a target space satellite of claim 7, wherein said cloaking apparatus is monitored by a control station.

11. The method of nondestructively disabling a target space satellite of claim 10, wherein said control station communicates with said cloaking apparatus that said target space satellite has entered said structure and is to be enveloped.

12. The method of nondestructively disabling a target space satellite of claim 7, wherein nonedestructively disabling said target space satellite is accomplished without creating debris.

13. The method of nondestructively disabling a target space satellite of claim 7, wherein nonedestructively disabling said target space satellite is accomplished without breaking said target space satellite into multiple pieces.

14. The method of nondestructively disabling a target space satellite of claim 7, wherein nonedestructively disabling said target space satellite is accomplished without damaging said target space satellite.

15. The method of nondestructively disabling a target space satellite of claim 7, wherein nonedestructively disabling said target space satellite is accomplished without destroying said target space satellite.

16. The cloaking apparatus for nondestructively disabling a target space satellite of claim 1, wherein, in response to a control signal, said structure is configured to be opened by said actuator to allow said nondestructively disabled target space satellite to become enabled of communication with a station external to said target space satellite.

17. The cloaking apparatus for nondestructively disabling a target space satellite of claim 1, wherein said actuator is configured to move said structure between said open configuration and said closed configuration without creating debris.

18. The cloaking apparatus for nondestructively disabling a target space satellite of claim 1, wherein said actuator is configured to move said structure between said open configuration and said closed configuration without breaking said target space satellite into multiple pieces.

19. The cloaking apparatus for nondestructively disabling a target space satellite of claim 1, wherein said actuator is configured to move said structure between said open configuration and said closed configuration without damaging said target space satellite.

20. The cloaking apparatus for nondestructively disabling a target space satellite of claim 1, wherein said actuator is configured to move said structure between said open configuration and said closed configuration without destroying said target space satellite.

* * * * *